US008005866B2

(12) United States Patent
Sureka (10) Patent No.: US 8,005,866 B2
(45) Date of Patent: Aug. 23, 2011

(54) DATABASE

(76) Inventor: Prateek Sureka, Kolkata (IN)

(\*) Notice: Subject to any disclaimer, the term of this patent is extended or adjusted under 35 U.S.C. 154(b) by 472 days.

(21) Appl. No.: 11/867,156

(22) Filed: Oct. 4, 2007

(65) Prior Publication Data

US 2008/0086498 A1 Apr. 10, 2008

(51) Int. Cl.
*G06F 7/00* (2006.01)
*G06F 17/30* (2006.01)
(52) U.S. Cl. ......................... 707/795; 707/961
(58) Field of Classification Search .................. 707/793, 707/963, 795, 961
See application file for complete search history.

(56) References Cited

U.S. PATENT DOCUMENTS

| | | | | | |
|---|---|---|---|---|---|
| 5,687,367 | A | \* | 11/1997 | Dockter et al. | 707/102 |
| 5,787,442 | A | \* | 7/1998 | Hacherl et al. | 707/201 |
| 5,809,297 | A | \* | 9/1998 | Kroenke et al. | 707/102 |
| 5,819,251 | A | | 10/1998 | Kremer et al. | |
| 5,826,259 | A | \* | 10/1998 | Doktor | 707/4 |
| 6,035,300 | A | \* | 3/2000 | Cason et al. | 707/102 |
| 6,139,201 | A | | 10/2000 | Carbonell et al. | |
| 6,701,367 | B1 | | 3/2004 | Belkin | |
| 6,735,593 | B1 | | 5/2004 | Williams | |
| 6,990,440 | B1 | \* | 1/2006 | Sroka | 704/4 |
| 2003/0120479 | A1 | | 6/2003 | Parkinson et al. | |
| 2003/0130976 | A1 | | 7/2003 | Au | |
| 2005/0137855 | A1 | | 6/2005 | Maxwell, III | |

FOREIGN PATENT DOCUMENTS

| | | |
|---|---|---|
| WO | WO 2008/041242 A3 | 11/2008 |
| WO | WO 2008/041242 A4 | 1/2009 |

OTHER PUBLICATIONS

Prateek Sureka, Statement under PCT Article 19(1), Nov. 21, 2008, PCT Application No. PCT/IN07/000426.
Miranda Le (authorized officer), "Written Opinion of the International Searching Authority", Sep. 22, 2008, PCT Application No. PCT/IN07/000426.

\* cited by examiner

*Primary Examiner* — Robert Timblin
*Assistant Examiner* — Susan F Rayyan
(74) *Attorney, Agent, or Firm* — Dicke, Billig & Czaja, PLLC (57) ABSTRACT

A non-relational transactional and analytical database is described. It has a novel data architecture that allows data to persist without requiring any schema definition. The database also provides a file system with in-built versioning, reliability and security and can be deployed in a distributed environment. The approach adopted is to break down data into its fundamental atomic components, called memes, and use a special type of graph (utilizing non-standard vertices and edges) to create logical relationships, represented by links, between these components. The database operational functionality is deployed through an application program interface (API). The underlying query language is based on recursive triplets of the form (subject, verb, object) and can be easily augmented with different query parsers, which translate from some source syntax to this syntax. The memes and links may be identified with Universally Unique Identifiers (UUIDs). Additionally, the database may provide file system manipulation functionality through the use of UUIDs.

23 Claims, 6 Drawing Sheets

Class Diagram of Poseidon Architecture

Figure 1: Class Diagram of Poseidon Architecture

Figure 2: The Ontological Model

Figure 3: Filesystem Links in the Ontological Model

Database architecture

Index 1 (Alias - UUID)     Index 2 (UUID - Neuron)

DATABASE

TECHNICAL FIELD

This disclosure generally relates to databases and in particular it relates to a novel database with an architecture involving method of creating and accessing databases.

BACKGROUND

There are many ways in which databases are currently architectured. The two main ones are: RDBMS (relational databases), ODBMS (Object databases). Both systems have been in existence for considerable length of time. RDBMS has enjoyed wider popularity than the ODBMS systems. However both have drawbacks.

Relational database management systems are widely used across industries to store and manipulate data. One of the main problems with relational databases has been the structural rigidity of data once defined using a data definition language (DDL). This has forced data to converge into silos of information each bounded by their own schema definition and each schema constructed for a specific purpose. This lack of integration has prohibited applications from taking advantages of the complex relationships between data from disparate sources and necessitated redundancy of data. The complexity of Online Transaction Processing (OLTP) vs. Online Analytical Processing (OLAP) systems and the conversion process between them is a direct case in point.

Some of the drawbacks of the RDBMSs are:

1. In case of the systems that use database cursors it is found that:
    Application developers need to understand that the underlying data can change between the times that data records are accessed via the cursor: previously retrieved records may have been deleted, records may have been inserted into previously retrieved portions of the result set, or previously retrieved records may have been modified.
    Not all cursors are created equal. Some cursors only allow forward scrolling.
    Cursors are a resource drain on the database because they are memory intensive.
2. In case of systems using Java Virtual Machines, it has been found that:
    Different version of VMs between application server and database server increases complexity of development.
    Behavior implemented in the database can easily become a bottleneck.
3. RDBMSs use triggers. There are drawbacks associated with these:
    Hand-crafted, or hand-modified, triggers can be difficult to maintain and will increase your dependency on your database vendor.
    Triggers are typically implemented in a proprietary language requiring an extra skill set on your team.
    Because triggers are automatically invoked they can be very dangerous (such as "uncontrolled" cascading deletions resulting from chained delete triggers).
    Behavior implemented in the database can easily become a bottleneck if your database doesn't scale well.

Another problem area while using RDBMSs is coupling. Coupling is a measure of the degree of dependence between two items—the more highly coupled two things are the greater the chance that a change in one will require a change in another. Coupling is a major challenge when it comes to software development, and the more things that your database schema is coupled to the harder it is to maintain and to evolve. Further challenges that one faces with RDBMSs are:

1. Data integrity is difficult to ensure with shared databases. Because no single application has control over the data it is very difficult to be sure that all applications are operating under the same business principles.
2. Operational databases require different design strategies than reporting databases. The schemas of operational databases reflect the operational needs of the applications that access them, often resulting in a reasonably normalized schema with some portions of it denormalized for performance reasons. Reporting databases, on the other hand, are typically highly denormalized with significant data redundancy within them to support a wide range of reporting needs.

Many of these issues exist because of the nature of the database architecture.

Thus, a database system that is fundamentally different in its architecture may overcome the drawbacks mentioned above.

Some drawbacks of the ODBMSs are:

1. Rigid schemas with constraints need to be defined in advance.
2. All instances of objects have same predefined properties.
3. OLAP processing is inefficient.

There is therefore a need to provide a database that successfully addresses the various drawbacks of the existing database models, and provides a robust, flexible, and secure database.

SUMMARY

A non-relational transactional and analytical database is described. It has a novel data architecture that allows data to persist without requiring any schema definition. The database also provides a file system with in-built versioning, reliability and security and can be deployed in a distributed environment. The approach adopted is to break down data into its fundamental atomic components, called memes, and use a special type of graph (utilizing non-standard vertices and edges) to create logical relationships, represented by links, between these components. The database operational functionality is deployed through an application program interface (API). The underlying query language is based on recursive triplets of the form (subject, verb, object) and can be easily augmented with different query parsers, which translate from some source syntax to this syntax. The memes and links are identified with Universally Unique Identifiers (UUIDs). Additionally, the database also provides file system manipulation functionality through the use of UUIDs.

DETAILED DESCRIPTION

The database described below is an integral part of an overall architecture that comprises a database, and a security layer wrapped in an application program interface (API).

Structure of the Database

The database is based on a unified data model wherein the source data is split into its fundamental atomic components. In the database of the present invention, these fundamental atomic components are called memes. A meme is therefore defined as the fundamental indivisible unit of data. Memes are similar to a single cell in a table of a conventional database.

Memes can be logically bound together with other memes to create relationships which are called links. Links only exist in association with memes or other links. Each link has a subject, object and a verb associated with it. The subject, object, or the verb can be a meme or another link. It is important to note that each of these attributes, i.e. that of being a subject, an object, or a verb, is a property of a link and not specific to memes. For example, a meme can be a subject in one link and an object in another. It is a feature unique to the database that one or more of the subject, verb and object of a link can be another link (i.e. it is not limited to memes alone)

Figure 1:
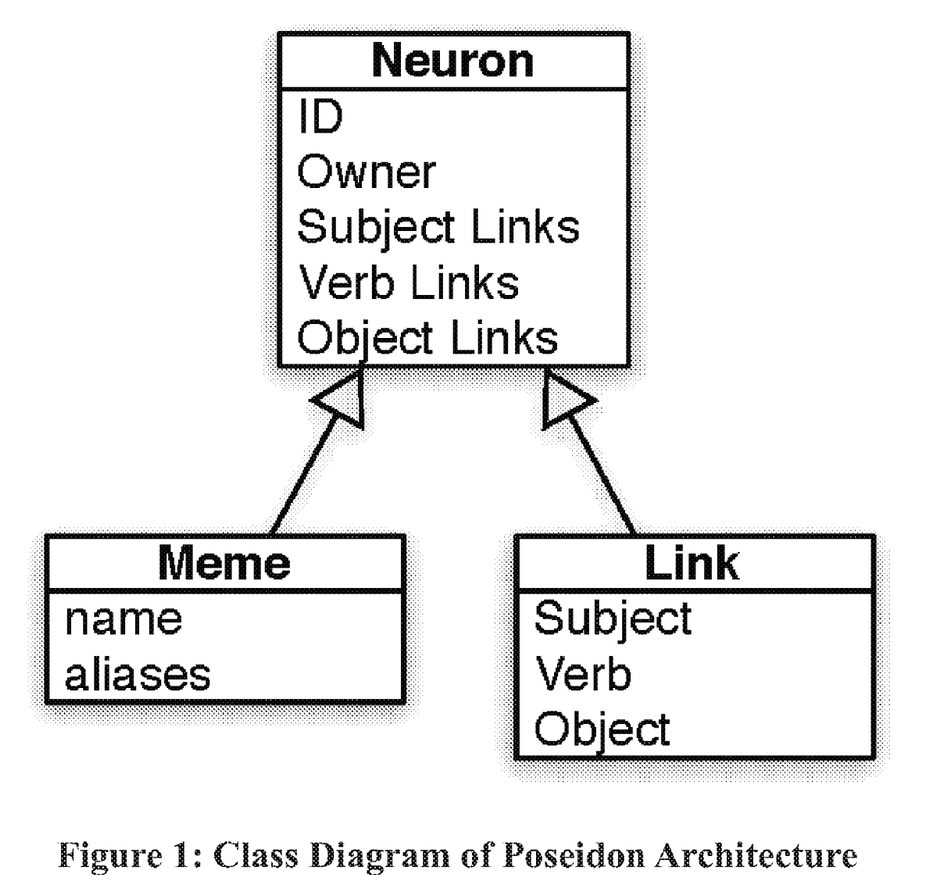
FIG. 1 shows the class diagram of the database.

For the purpose of further discussion an entity called 'neuron' is defined. As shown in FIG. 1, a 'neuron' is defined as a class comprising of two subclasses—'meme' and 'link'. Since memes and links are both subclasses of a master 'Neuron' class, the definition of a link can be restated as a three-way relationship between neurons. Note that this allows recursive links.

The architecture of the database is described next. The memes are defined in terms of canonical names and aliases. The database, G, is defined as a union of a set of memes, M, and a set of links, L. Each meme has a set of aliases of which exactly one is the name. All instances, x, of neurons are assigned a unique global identifier UUID(x). Although we use UUIDs for the purposes of this discussion, any unique identifier can be used. Relationships between the neurons are defined through links such that each instance, x, of a neuron is represented as a subject or an object or a verb of a link. This is achieved through definition of inverse functions, LS, LO, and LV for subjects S, objects O, and verbs V respectively. This implies that for any link (l) where S(l) is x, LS(x) is a set of links of which the link l is a member. The same pair of inverse functions apply to O and V such that O(l)=x implies that l is an element of LO(x) and V(l)=x implies that l is an element of LV(x) It should be noted that LS, LO, and LV are defined for all neurons (i.e. for each meme or link), however, S, O, and V are defined only for links, thereby making the memes leaf nodes (i.e. the database's smallest units that cannot be divided further).

Since neurons are internally referenced solely via identifiers, a mechanism is required for resolving names and aliases into neurons. Hence, a case insensitive index is defined as a mapping between aliases of the neurons and neuron identifiers.

Database Query Engine

A user wishing to locate an instance of a meme or a link needs to search the database. This is facilitated through a query engine comprising of a query parser and a query processor, the grammar and algorithm for which is defined below:

$$Q \rightarrow M | L \qquad 1$$

$L \rightarrow (Q, Q, Q) | function(Q, Q, Q)$

Each query Q consists of either a meme query, M, or a link query which is 3-tuple of queries, L, (each of which are meme queries or nested link queries) which represent the subject, verb and object in a link). L may also optionally contain a function modifier to be applied to the result of the query. This is useful when using nested link queries. The meme query can be the identifier of a link, a wildcard (*), an alias (which will return all links having that alias), a partial alias containing one or more wildcards (*), a numerical range separated by the colon literal (:) e.g. 2:45 or a boolean expression containing a combination of the above.

2. Meme queries are resolved via direct lookups into indexes. In case the expression is an identifier, no resolving is required, for expressions containing aliases, the alias-to-identifier index is used. Other expressions can use any index defined by the implementation (e.g. B-tree, hash table, suffix tree, Patricia tree, R-tree).

3. The query algorithm matches link queries in the following manner. For each sub query Qs, Qv and Qo, a set of candidate links is computed by taking the union of the set LS(x), the union of the set LV(x), the union of the set LO(x) for each neuron (x), in Qs, Qv and Qo. The result is the intersection of these three sets.

In traditional databases, cursors, which are pointers to rows of data within a database table, are used to navigate the table. The database does not have tables, therefore cursors are not relevant. The database therefore advantageously avoids the problems associated with cursors, which have been discussed in the prior art section.

Any data navigation scheme must allow easy movement between memes and links. Although this is fully possible with the Basic API and query methods, they can sometimes become syntactically verbose and conceptually complex to maintain. The database uses "ideas", which are a high level solution to this problem. An "Idea" is another class. Groups of neurons can be converted into a single idea for easy representation and manipulation. Each instance of an idea (i) is characterized by a primary neuron (x), which it represents. This instance, has attributes corresponding to the verb-neurons of all links in which x participates as the subject. Further, the values of each such attribute is the object of the corresponding link. Hence, an "idea" gives a complete representation of the neuron in the database. Ideas can then be converted into an alternate representation, which contains attributes within a limited domain for the purposes of consumption by an application.

During the navigation of conventional databases, the cursors need to store entire tables in memory, leading to performance overheads. One of the advantageous features of the database architecture is that the navigation mechanism based on the idea concept needs to store only the data related to the idea of the neuron under consideration. This results in small navigation-time memory requirement thereby making the navigation operation highly scalable.

Furthermore, the navigation mechanism has further advantage over the cursor-based schemes. This has to do with navigation-time modifications to the database. These are not easily possible with the conventional systems, whereas the ideas-based systems have no such restrictions. Setting the value of an attribute automatically creates the memes/links in the database. Moreover, transaction support is in-built. Changes are only committed to the database when the user calls the 'save' method of an "idea" instance.

We will now illustrate another advantageous aspect, which has to do with the state of consistency of the database. Consider two ideas, a and b such that b is an attribute of a. This implies that the neuron referenced by b is participating as the object in a link where the neuron referenced by a is the subject. This means that the definition of a is dependent on b but b is not dependent on a. When the idea a is saved, b is saved automatically. However, separately saving b has no impact on a. This mechanism prevents the database from being in an inconsistent state Hence "ideas" are fully compatible with the object API and provide a natural transition to an even higher object oriented abstraction layer of database access.

Ontology

Figure 2:
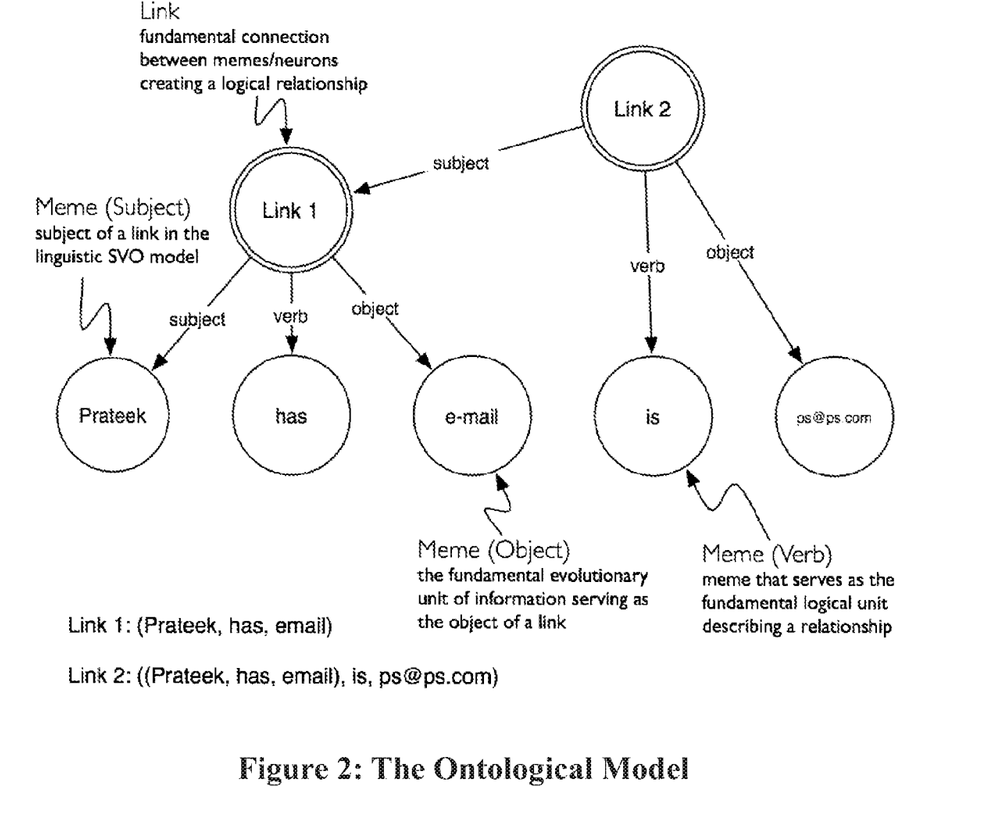
FIG. 2 shows the ontological model of the database.

FIG. 2 shows the ontology of the database.

Suppose we wish to represent a simple entity (Person) with two attributes (name, email). In a typical relational database, this would be done in the schema using a table (person) for the entity with two columns (name and email) each with pre-specified data types. This would then apply to all instances (rows) of persons in the database.

Suppose we have an instance of Person, Prateek with email, ps@brainwavelive.com. This is represented with the pseudocode as below:

Person x=new Person()

x.name="Prateek"

x.email="ps@brainwavelive.com"

In the database, this same thing is broken up into a two step process. First, we create the basic raw-materials. Since we shall represent Person, name and email in the database, we create memes for each of them. Further, we create memes for each type of relationship between these memes. e.g. Prateek is a Person, Prateek has attributes and Prateek has name is Prateek. Hence, we create memes for "is a", "has" and "is". These can be used as verbs to denote similar relationships all through the system.

Finally, we create two memes for the data: "Prateek" and "ps@brainwavelive.com". At this point, although the database contains all the data, it is unusable without the logical relationships. The first thing to do is to pick a meme for the canonical name of the object. In this example, we pick "Prateek" as the canonical name although it is feasible to use an auto generated id. First we create a link with subject "Prateek", and object "Person". Since the purpose of this link is to denote that "Prateek" is a hyponym of "Person" and "Person" is a hypernym for "Prateek", we use the "is a" meme as the verb. This gives us the link (Prateek, is a, Person) with each element in the ordered 3-tuple or a triplet representing the subject, verb and object respectively. Hence we can begin to create an ontology for Prateek.

Continuing with the exercise, we now need to represent the two attributes of Prateek (i.e. name and email). One of the most important things to note is that the database advantageously related the name and email directly to the data itself and not to the specification of Person. The unique structure of the database advantageously eliminates the need for inference rules such as if Person has name and email, then everything which "is a" Person also must have a name and email. Hence, we would create two more links:

("Prateek", "has", "name"), and ("Prateek", "has", "email").

These links sufficiently state that Prateek has the attributes name and email. Elaboration of what the actual values are is carried out using the unique recursive properties of the database. We do this by creating two links represented by:

(("Prateek", "has", "name"), "is", "Prateek"), and (("Prateek", "has", "email"), "is", "ps@brainwavelive.com")

In both these links, the subject is another link, with their own 3-tuple structure. This is permissible since in definition of $l \in L$, $S(l) \in MUL$, $V(l) \in MUL$, $O(l) \in MUL$.

As another advantageous feature of the database, this architecture enables us to do more without the need for any more architectural constructs. For example, consider the following links, which represent some rules for database access:

(("Prateek", "has", "name"), "is a", "string"), and ((("Prateek", "has", "name"), "has", "read only"), 'is', 'true').

An important point to note here is that creating these links is pointless since it does not make these rules enforceable universally. There is no mechanism defined to enforce these rules for all authors and guarantee the same for consumers. Authors are free to add attributes at will and consumers are expected to use ideas or else write generalized programs which first query the database to find available attributes. This flexibility is a unique advantageous feature of the database which enables authors and consumers to share data without the need for direct collaboration.

There is another way to model the information into the database, which is explained with the help of another example.

Let us try and model into our database that John lives in New York City. We create the database by creating relevant neurons. John and New York City are the minimum memes that we need to create. In addition, the concept of living somewhere can be represented as yet another Meme. This is done by creating another meme which can perhaps simply be called "lives in" or as the attribute name "city" which is yet a third meme.

Figure 4:
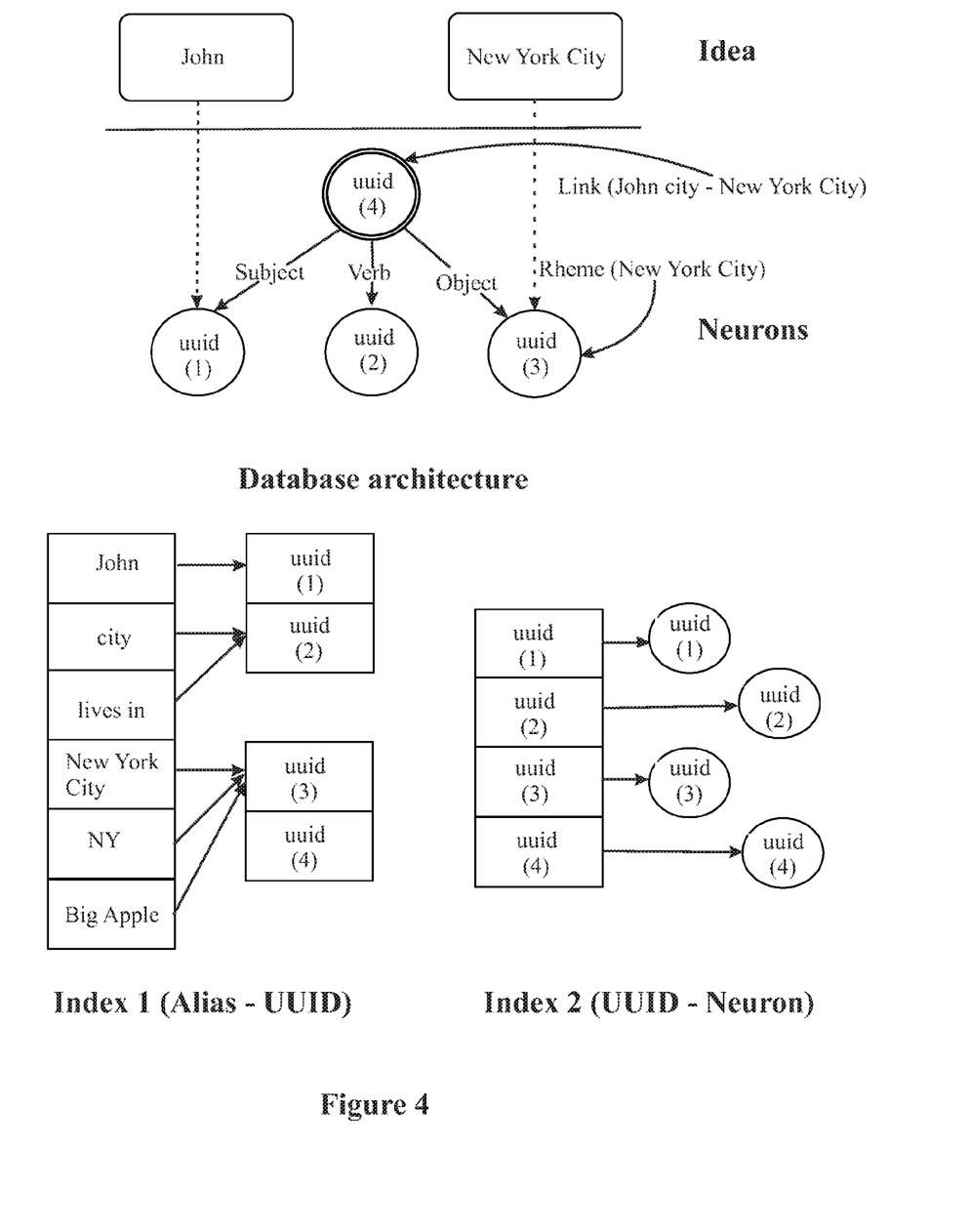
FIG. 4 shows the database architecture for use with Example 1.
Figure 5:
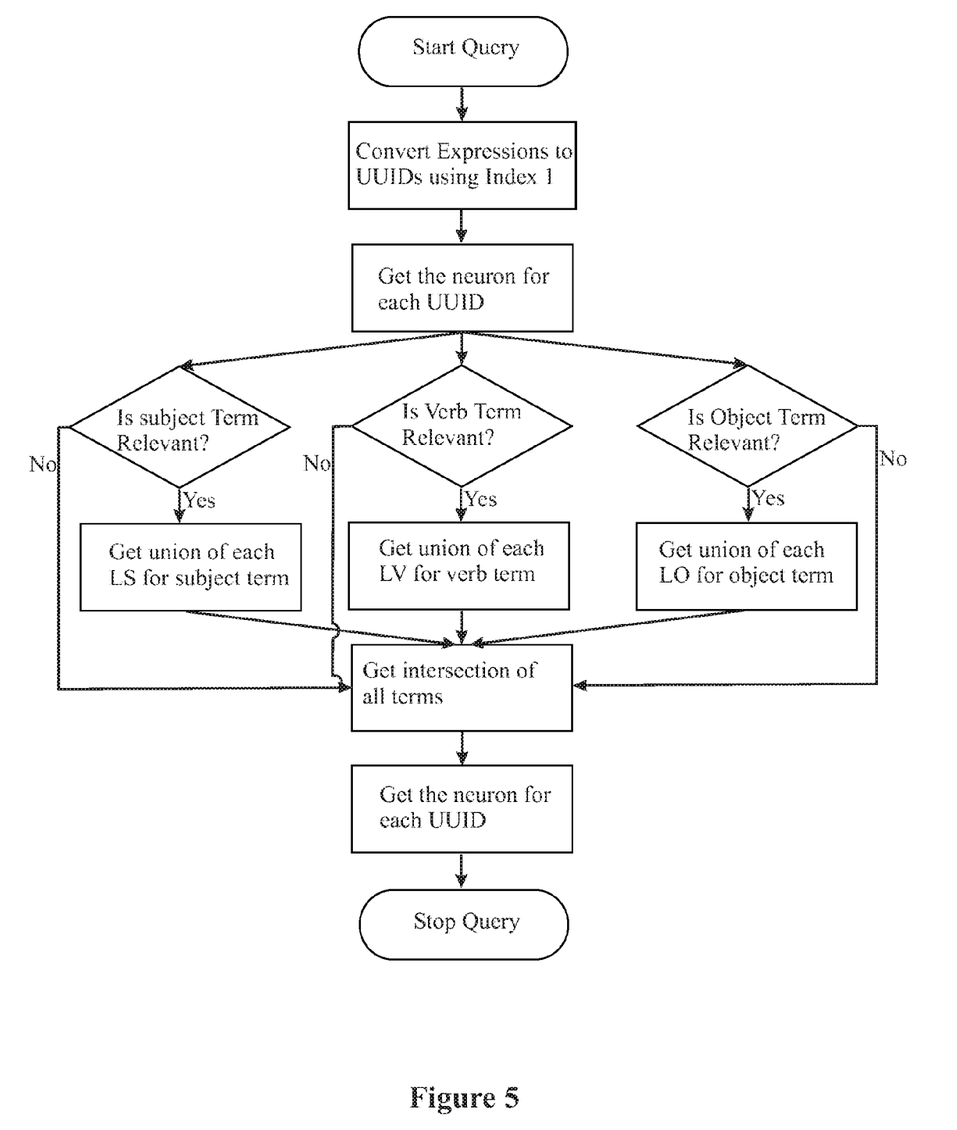
FIG. 5 shows a generalized flowchart for the query processor.

The database assigns for each neuron a UUID which can be used to uniquely identify it. As shown in FIG. 4, which show that the words "John", "city" and "New York City" are simply aliases which point to the relevant UUIDs as represented by Index 1.

We require a fourth neuron which will be the Link (l) which binds the various memes together. Hence, a Link is created whose subject is the meme "John", verb is the meme "lives in" or "city", and object is the meme "New York City".

Hence the relationships are represented as subject $S(l)$=Meme "John";

verb $V(l)$=Meme "city" or the meme "lives in", and the object $O(l)$=meme "New York City".

In addition, $LS$(Meme "John")=set(l), $LV$(Meme "city")=set(l), $LO$(Meme "New York City")=set(l)

This completes our modeling.

Modifiers

Often there is link-specific information related to the subject, object or a verb of a link. These pieces of information, also described as modifiers or adjectives, which are only relevant in the context of the link, serve to further describe the subject, object or the verb that they apply to. Simply put, modifiers allow users to enhance links with richer, relation specific information. Each modifier belongs to the neuron class and hence is either another meme or link. Modifiers are independent of each other and the list of modifiers is unordered.

For example, modifiers are used to logically delete or negate links. Adding the "not" neuron as a verb modifier in any link can be interpreted as logically negating the link.

Application Programming Interface (API)

It is possible to abstract database calls into object persistence model through a conventional object relational broker (ORB). Although the database is not a true object-database, it provides a similar application programming interface (API). The API is superior to the conventional ORBs because it does not have to deal with the schema constraints of conventional databases. This allows the object definition to vary from application to application with the database storing the superset of data at all times. This makes the interface much richer since each application is able to use its own object specification. The APIs that interface with databases use numerous calls while interfacing. Among the other calls available, the API exposes two major calls that are described below:

1. GET: This call takes either the canonical name for a meme or its identifier. It then retrieves all attributes of the meme, and creates an idea instance and populates its properties with the attributes of the meme. The idea instance is returned.
2. PUT: The second call takes an instance of a class and uses introspection to identify all attribute names and values of that instance. It then serializes this information recursively (since attribute values may be other instances) using the basic API by converting attribute names and values to memes and relations between them into links.
3. GETVALUE: This call accepts a user-defined class definition as a parameter and attempts to return the most complete view of the meme as an instance of that class. If the class definition doesn't support an attribute of the meme, it is ignored. This allows applications with limited scope to take a myopic view of the memes in consideration.

Additional Features of the Database

There are several other advantageous features described below.

File System Operations

Figure 3:
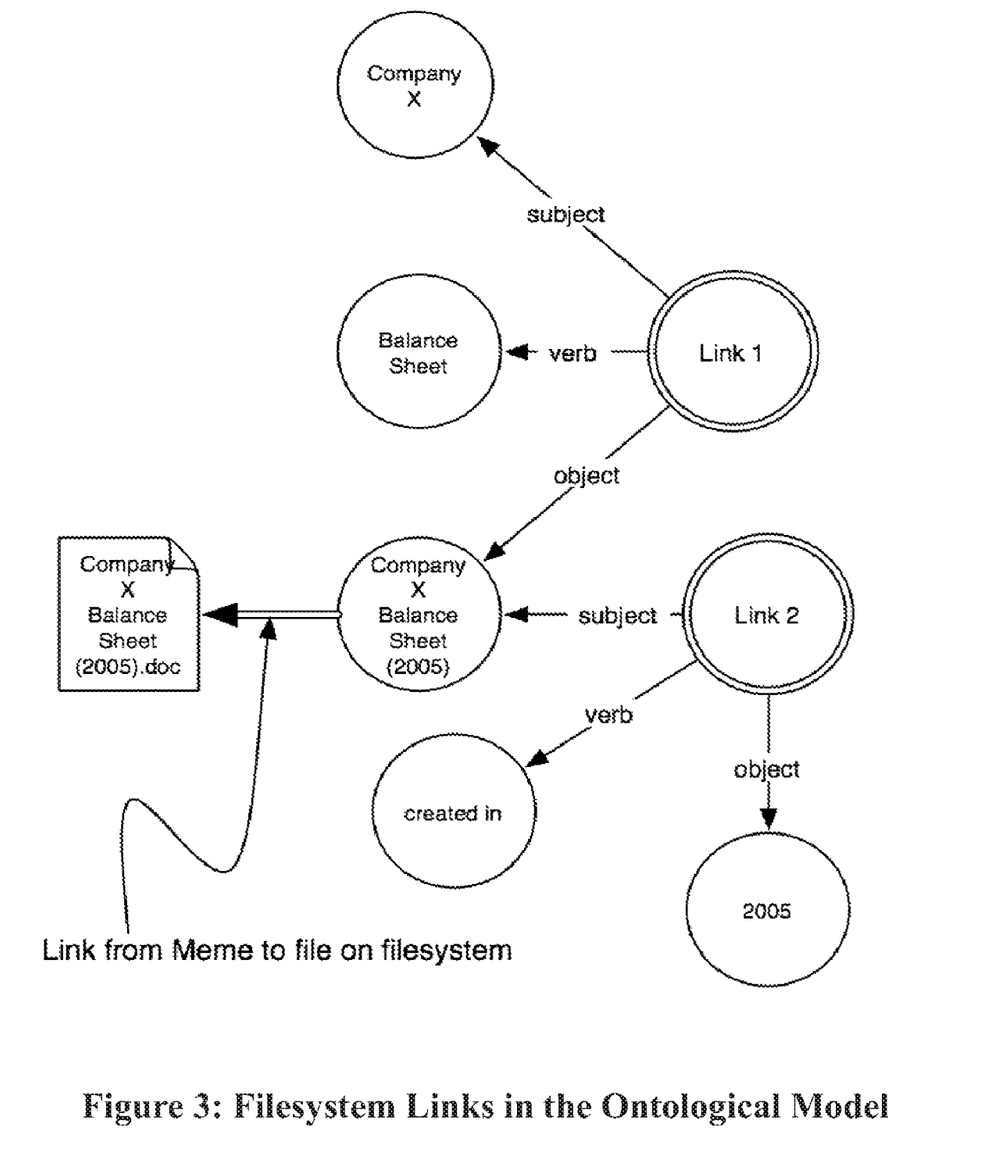
FIG. 3 shows the file system model of the database.

The database also supports the storage of binary data using a UUID system. FIG. 3 shows the file system model. A single meme may or may not point to a file. Links cannot point to a file. The name of a file is same as the UUID of its meme. All file system metadata related to the file (i.e. extension, file type, creation date and date of last access) is stored in a dictionary (along with other, user defined metadata) within the meme. Actual data of the file is stored on the underlying file-system.

The database also uses the meme/link mechanism to provide native versioning of the file system. New versions are represented as objects in a link where the subject is the old version. Even newer versions can reference the last version or the original copy (as required by the user). Hence, this simple scheme can be used to implement a flat, hierarchical or multi-dimensional versioning scheme as per the needs of the user. Although a special API call is provided for convenience, retrieving existing versions is carried out using the standard query mechanisms.

Finally, adding and retrieving files is also possible with the file system operations of the database. The adding of files is carried out through an API call that expect the UUID of the meme in which the file is to be saved, a structure containing the attributes of the file and the file data. The retrieval of files is carried out through a special function that expects the id of the meme and returns the file data stream.

Data Security

The database also provides a built-in security mechanism with meme level resolution. Most data in a collaborative environment (multi-user access) is considered public information hence by default all memes are left unlocked or open to user access. Individual memes can be blocked off from access by participating in the security models. Participation in security model levies an overhead and is left to a user's deliberate choice. Security is imposed through a two tier model comprising a capabilities tier and a policies tier. The capabilities model is an evolutionary replacement for the traditional permissions model. This is widely accepted to be safer model by a person skilled in the art than a traditional model based on permissions and access control.

Figure 6:
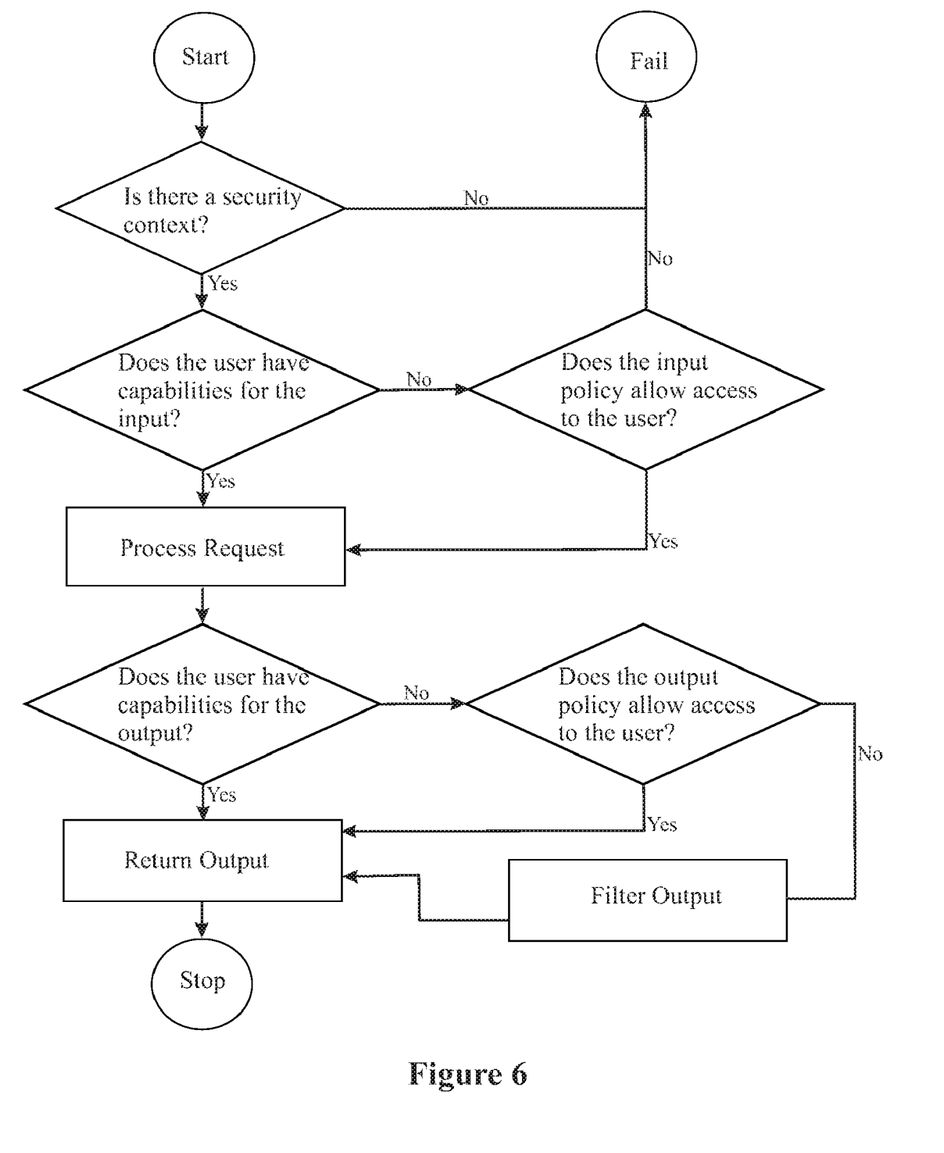
FIG. 6 shows the flowchart for security operations.

FIG. 6 shows a flowchart for the security operations of the database.

The security system of the database architecture is represented in terms of actors, a, and resources, r. Users, applications (or anything else represented by a meme) assumes the role of an actor. Each actor has a global security context which stores keys (capabilities) to various resources (other memes). This is advantageously different from the conventional permissions based system where access control data is stored in the resource (as opposed to the actor). In the database architecture, the mere possession of a capability is implicit implication that an actor is authorized to access a resource.

An actor, represented by a meme, refers to an account of any user (human or computer program) that is able to access the database. Actors get a secure view (referred to as a context) of the database. Within the context, users are able to access secured resources. Actors and resources are both represented by memes. Hence it is also possible for the meme of an actor to behave as a resource in some other context. A simple example of this would be a computer program which is owned by a human user. Both are represented by memes which are actors, and hence enable both actors to access the database within separate contexts. However, the meme for the computer program may also be a resource with respect to the human user with settings that for example, prevent the human from making modifications to the program.

Resources are any memes that need to be secured. Links do not have their own security but instead inherit their security from memes that represent them. There are currently three security operations defined on all memes (and via inheritance, on links as well). The most basic operation is "read", which allows or disallows an actor to read the resource (or know of its existence). The second operation is the "link" operation which specifies whether the actor is allowed to create links based on the resource. Finally, the "write" operation governs access to the meme itself (such as modifying its name or aliases, file-data or metadata or other security settings).

The structure of the actual security model is explained next. All actors have a list of capabilities for each operation (read, link and write). These capabilities are basically 'keys' using which the actor can access the resource in a way that enables them to perform the relevant operation. For example the capability for a user might be: {'read':memeA, memeB, memeC, 'write':memeC, 'link':memeB, memeC} wherein the entities memeA, memeB, and memeC are simply the UUIDs of the respective memes. Alternatively, the entities are represented by specialized keys that point to the relevant UUIDs. The system restricts or prohibits illegal modification of resources outside secure contexts.

In order to provide simple maintenance along with the powerful capabilities, a second tier—called the policies layer—is provided in the database. Policies are business rules that guide the security engine of the database in the absence of specific capabilities. Hence, capabilities need only be used in the exceptional case. Most security settings can be managed by simply creating a few blanket policies.

Resources have policies. Each operation (that is, read, write, and link) of a resource has a policy defined for it. Unlike in the case of capabilities, the policies are not a list. Policy for a resource, r, is a set of functions $f_{read}(a)$, $f_{link}(a)$, $f_{write}(a)$, where the argument 'a' of the respective functions 'f' is an arbitrary actor. A function returns a value True or False, which dictates whether the actor a has access to the resource r for the given operation; the value True allowing the access and the value False denying it. The database of the present system also allows formation of a chain of functions together to form a cumulative function.

The order of priority is such that capabilities are checked first. If the capabilities of an actor fail to grant access, only then policies are checked. If capabilities clear the security barrier, the policy definition is redundant (capabilities supersede policies).

Processing the security is described in the flowchart outlined in FIG. 6. Simply speaking, capabilities trump policies. To access a resource, an actor must either possess the capability for the relevant operation for the resource or be granted access by the policy for the resource. Either will do. An actor will be denied access to a resource if and only if it does not possess the capability and if the resource policy denies access as well. A key point to be noted is that possessing the capability is sufficient for gaining access, even if the policy denies access. This mechanism can be used to implement exceptions to a policy.

Based on the foregoing discussion, some of the advantages and unique features of the database are:
- Add data without defining its structure beforehand
- Ability to access data based on a limited class definition which enables applications to take a myopic view of data.
- Instances of 'null data' can be handled without system overheads
- Extend individual 'records' without having to redefine classes
- Since properties are not stuck inside classes, OLAP queries are possible without having to visit the entire class.
- No need for Ids and Primary Keys (automatically handled by UUIDs)

Summary of Advantages

The database is designed to serve as a universal repository for data. Since the relationships are tracked between atomic data units, it is possible to slice the universe across any dimension. Hence, multiple diverse applications may be served by providing different slices of data. Moreover, the client application need not know of the scope of data within the database. Instead, it is able to specify a class definition (much like a template) for the result-set. Since the authors need not agree with the consumers, the database is a perfect solution for fragmented environments with multiple players.

Operationally, the database reduces the costs of development by reducing the need for communication, negotiation and agreement (which typically implies a heavy overhead) between different parties involved in a project.

Moreover, the database is architected with a view towards backwards compatibility. Importing data from any relational database into the database described here is a single step process (each row in a table is an object instance which can be persisted) and can use the existing access methods of the relational database.

Exporting data from the database described here back into a relational database is possible. However the complexity of the data implies that any relationships not supported by the target schema will be lost.

EXAMPLE 1

The navigation of data is best illustrated with an example that follows.

Consider again the example from the ontology section where we represented that John lives in New York City using the database described above. We created the database by creating relevant neurons. John and New York City are the minimum memes that we needed to create. In addition, the concept of living somewhere was represented as yet another Meme. This was done by creating another meme which was simply be called "lives in" or as the attribute name "city" which is yet a third meme.

The database assigned for each neuron a UUID which was used to uniquely identify it. As shown in FIG. 4, the words "John", "city" and "New York City" are simply aliases which point to the relevant WUIDs as represented by Index 1.

We required a fourth neuron which would be the Link (l) which binds the various memes together. Hence, a Link was created whose subject was the meme "John", verb was the meme "lives in" or "city", and object was the meme "New York City".

Hence the relationships were represented as subject

S(l)=Meme "John";

verb V(l)=Meme "city" or the meme "lives in", and the object O(l)=meme "New York City".

In addition,

LS(Meme "John")=set(l),

LV(Meme "city")=set(l),

LO(Meme "New York City")=set(l)

Suppose now we wished to find from our database everyone who lived in the city of the New York City. The query for this took the form of:

(*, 'city', 'New York City'), or (*, 'lives in', 'New York City').

In plain English, the query for the query engine could be restated as: 'find all links where the verb is meme "city" (or the meme "lives in"), and the object is the meme "New York City"'.

The query processor executed the following steps in response to the query.

Step 1: Using Index 1, find all UUIDs corresponding to "city" and "New York".

Step 2: Using Index 2, find the neurons for the respective UUIDs.

Step 3: For each neuron for "city", find its set LV and take the union of all such sets. This returns the UUIDs of all links in which the verb is a neuron with alias "city" complying with the condition that the UUID of Link l must be an element in this set.

Step 4: For each neuron for "New York City", find its set LO and take the union of all such sets. This returns the ids of all links in which the object is a neuron with alias "New York City". The id of Link l must be an element in this set.

Step 5: Intersect the union sets from Step 4 and Step 5. This returns the UUIDs of all links with verb "city" and object "New York City". Use Index 2 again to retrieve the neurons. The Link l must be an element in this set. This is our result.

Next, suppose we request to specifically return the 'names' of persons living in New York City. We do this using the following query:

subjects(*, 'lives in', 'New York City')

The arguments of the query are the same as before, except instead of returning the entire link, we are now only requesting for the subjects of each of these links. In this case, after Step 5, we add another step.

Step 6: For each neuron in the intersected set of Step 5 (which must contain *all* links meeting our query, since we have intersected LV and LO), retrieve its subject S. This is the result of our query.

Suppose we wished to find from our database the ZIP Code of each person living in New York. One way to represent the query would be:

objects(subjects(*, 'city', 'New York City'), 'Zip Code', *)

Restated, this means: 'find all Memes which participate as the subject in a link where the verb is "city" and the object is "New York City"; For each such meme, find the objects of links where the subject is one of these memes and the verb is "Zip Code"'.

This also illustrates how queries can be nested and the result of one query can be used as the input term for another query.

In order to execute the nested query, we executed all the six steps listed previously. Thereafter, we executed Step 1 afresh, calling it Step 7 for our example, followed by other steps as listed below.

Step 7: Using Index 1, find all WUIDs for the alias "Zip Code"

Step 8: Using Index 2, find all neurons for the UUIDs found in Step 7.

Step 9: For each neuron for "Zip Code", find its set LV and take the union of each such set. This returns the ids of all links in which the verb is a neuron with alias "Zip Code".

Step 10: Intersect this set with the result set from Step 6. Use index 2 again to retrieve the neurons.

Step 11: Find the object O for each neuron in Step 10. This is our result.

While the above description contains many specific details, these should not be construed as limitations, but rather as an exemplification of preferred embodiments. Many other variations are possible. In particular, references to aspects of "the database" should not be deemed to define mandatory components unless explicitly stated by the following claims.

I claim:

1. A database system, comprising a computer having at least one processor; a non-relational transactional and analytical database executing on said processor, said database having at least two neurons, wherein one of said neurons is classified as a meme that is identified by at least one name, said name being termed as an alias, and the other said neuron is classified as a link, said link representing a logical three-way relationship between any three neurons in the database, and wherein said meme and said link are identified in terms of identifiers belonging to an arbitrary system of unique identification; and further wherein the database is operated through an application program interface (API); wherein each of said memes references a file of binary data stored with name equal to the identifier of said meme, file system metadata related to the file is stored within the meme and actual data of the file is stored on the underlying file-system.

2. The database system of claim 1, wherein for each instance, x, of a neuron, an idea instance is defined whose list of attributes is equal to V(LS(x)), and the value of each attribute is the idea of the corresponding neuron in O(LS(x)), and wherein the navigation through said database is optionally carried out from the idea of said instance x to the idea of any neuron in O(LS(x)) on the basis of said attributes of said idea of said instance x.

3. The database system of claim 1 wherein the number of said neurons is greater than two.

4. The database system of claim 1 wherein each of said links has three attributes, namely a subject, an object and a verb associated with it, and wherein each of all three said attributes is either a meme or another link, and wherein each of the three said attributes is a property of a link and not specific to memes, and wherein said neuron is either a meme or a link but not both and not neither, and wherein each of all of said neurons has at least one or more aliases; wherein one of said aliases is used as the name of the neuron, and any of which said aliases is available to be used to refer to the neuron, and wherein the aliases of said neurons are resolved to said identifiers with the help of a first index, wherein said first index defines a mapping from each alias to said identifiers within the system; said first index further being case-insensitive.

5. The database system of claim 1, wherein said neuron is either a meme or a link but not both and not neither.

6. The database system of claim 1, wherein each of all of said neurons has at least one or more aliases; wherein one of said aliases is used as the name of the neuron, and any of which said aliases is available to be used to refer to the neuron.

7. The database system of claim 1, wherein the relationships between the neurons are defined through links such that each link (l) comprises up to three neurons each of which neurons may serve as one or more arguments of the link, that is the subject or the verb or the object, such that the link (l) has exactly one subject (S), and one verb (V), and one object (0); and further wherein for each instance, x, of any of said neurons representing the subject, object and verb of the link (1) is defined inverse functions LS(x), LO(x), and LV(x), respectively, such that LS(x), LO(x), LV(x) return the set of links, of which set said link (l) is a member, and wherein the inverse functions LS, LO, and LV are defined for all neurons; and wherein the subject,(S), the object (0), and verb (S) are defined only for links.

8. The database system of claim 1, wherein the aliases of said neurons are resolved to said identifiers with the help of a first index, wherein said first index defines a mapping from each alias to said identifiers within the system; said first index further being case-insensitive.

9. The database system of claim 1, wherein said database further contains a query engine that is accessed using a query language that is based on recursive triplets of a form that depends on subjects, verbs and objects.

10. The database system of claim 1, wherein said database further contains a query engine to which queries are submitted, said queries being either a meme query ($Q_m$), or a link query ($Q_l$), said meme query further being in the form of either an identifier of a meme, or an alias or a partial alias optionally containing wildcards; wherein said link query, $Q_l$, is a triplet comprising $Q_S$, $Q_V$, $Q_O$, each of the elements of the triplet being either a meme query or nested link query, and wherein each one of the elements represents the subject, verb and object, respectively, in the link being submitted as the query.

11. The database system of claim 10, wherein said meme queries ($Q_m$) are resolved via direct lookups into said first index.

12. The database system of claim 10, wherein for each instance of said triplet $Q_S$, $Q_V$ and $Q_O$, a set of candidate links is computed by taking the intersection of the three sets comprising the union set of all sets $LS(Q_S)$, the union set of all sets $LV(Q_V)$ and the union set of all sets $LO(Q_O)$ for each neuron referred to in said $Q_S$, said $Q_V$ and said $Q_O$ respectively.

13. The database system of claim 1, wherein said API exposing at least three major calls, namely a first call, and a second call, and a third call,
  wherein said first call, being a GET call, takes either the canonical name for a meme or its UUID, where after all attributes of the meme are retrieved, an instance of said class definition for the meme is created, and the properties of the are populated with the attributes of the meme, and wherein if the definition of class doesn't support an attribute of the meme, the attribute is ignored; and wherein
  the second call, being a GETVALUE call, takes an instance of a class and uses introspection to identify all attribute names and values of that instance, whereafter, said GETVALUE call serializes this information recursively using the basic API by converting attribute names and values to memes and relations between them into links, and wherein
  said third call, being a PUT call, takes an instance of a class and identifies introspectively all properties of that instance, whereafter said second call serializes the instance recursively using said API by converting attribute names and values to memes and relations between them into links.

14. The database system of claim 1, wherein said database further supports the storage of binary data using a system that operates by satisfying simultaneously a set of conditions; wherein said set of conditions comprises:
  a) a single meme may or may not point to a file,
  b) links do not point to a file,
  c) the name of a file is same as the UUID for a particular meme,
  d) file system metadata related to the file is stored in a dictionary within the meme, and
  e) actual data of the file is stored on the underlying filesystem in a directory reserved for the database which is specially secured.

15. The database system of claim 14, wherein the database system comprises a native versioning system which uses the meme/link architecture where each new version is represented as a neuron in the object of a link where the subject is the neuron representing the previous version to provide database level versioning of neurons which optionally includes binary data.

16. The database system of claim 15, wherein said file versioning system either is hierarchical or flat or circular in nature.

17. The database system of claim 16, wherein the adding of files is carried out through an ordinary API call, which expects the file data, and a dictionary of arbitrary metadata, and wherein the retrieval of files is carried out through an ordinary API call that expects the id of the meme and returns the file data stream, and wherein file versions are created and managed by another set of API calls which are entirely optional for the developer.

18. The database system of claim 16, wherein the retrieval of files is carried out through an ordinary API call that expects the id of the meme and returns the file data stream, and wherein file versions are created and managed by another set of API calls which are entirely optional for the developer.

19. The database system of claim 1, wherein said database also provides a built-in security mechanism applied to memes, in which security system some of the memes are classified as actors which represent persons or programs that access the database within a given context, and wherein all the neurons have at least three security operations defined on them, namely read, write and link; and wherein access to links is authorized if and only if access to said link's subject and object is authorized; wherein an actor is authorized for access if the response to the operation is True.

20. The database system of claim 19, wherein each said actor, a, has a capability for each of the operation selected from a group of operations comprising a read operation, a write operation, or a link operation, wherein said capability is represented as a set of keys to said resources for whom the actor seeks authorization.

21. The database system of claim 20, wherein all resources have a policy for each operation selected from a group of operations comprising a read operation, a write operation, or a link operation, each of which said policy is represented as a function P, the value, g, of which said function P is determined depending on the actor a, on which said function P is defined; and wherein g takes a value of either True or False, and wherein a value of True grants said actor a access to said resource r, and wherein a value of False denies said actor a access to said resource r.

22. The database system of claim 21, wherein said actor a attempting to access said resource r for a given operation is granted access if one of the two conditions is met, the first condition being if the capabilities for the said operation of said actor a includes a key to said resource r, and wherein the second condition is that the policy P for the said operation of said resource r, said policy being evaluated on said actor a, returns True.

23. The database system of claim 22, wherein memes are, by default, left readable and linkable but not writeable to everyone.

* * * * *